Patented Jan. 21, 1936

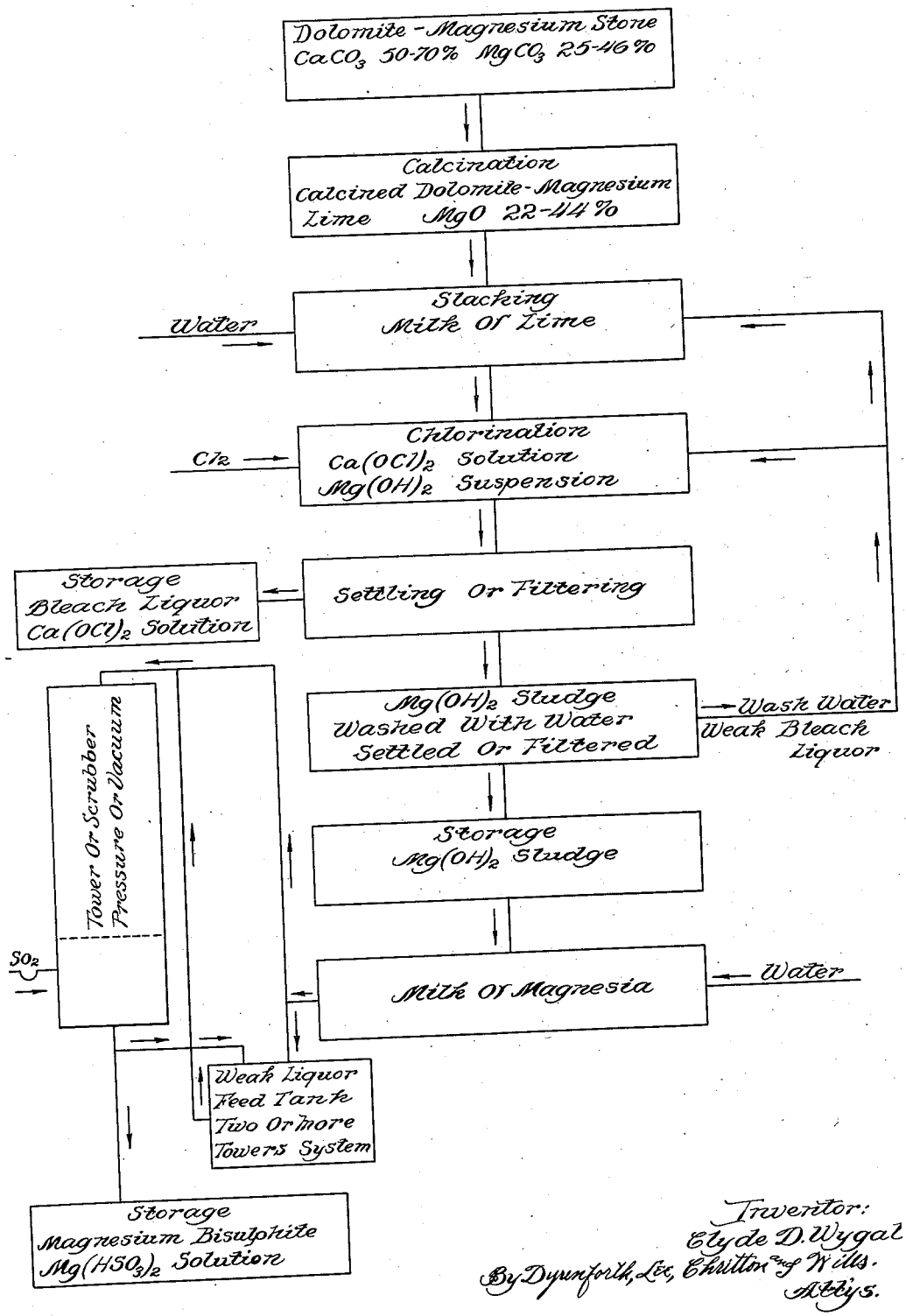

2,028,639

UNITED STATES PATENT OFFICE 2,028,639

DECALCIFICATION OF MAGNESIAN DOLOMITES

Clyde Douglas Wygal, Manistique, Mich., assignor to Inland Lime and Stone Company, a corporation of Michigan Application October 26, 1934, Serial No. 750,207

7 Claims. (Cl. 23—130)

This invention relates to a process for decalcification of magnesian dolomites.

Magnesian rocks have heretofore been substantially valueless as a source of magnesia and magnesium compounds owing to the difficulty and expense of separating the calcium therefrom. While authorities such as Mellor in "Organic and Theoretical Chemistry", vol. IV, pages 281–2, have suggested the removal of calcium from magnesia by the use of hydrochloric acid or sulfuric acid, it has always been conceded by the trade and by these authorities that chemical purification of dolomites was commercially impossible.

By means of the present invention, however, it is possible not only to prepare substantially pure magnesium compounds (say 90% magnesia or more) from low magnesia dolomites, but also to utilize fully the calcium present. The method is commercially feasible for the first time because of the fact that the calcium product, instead of being valueless as heretofore, is of high value as well as purity.

The invention is particularly valuable for magnesian dolomites having a magnesia content of 22% or upwards and particularly contents from 22–44%. The content of non-magnesian and calcium oxides should be less than 10% of the magnesia, but this is ordinarily the case in magnesian dolomites.

In accordance with the present invention, the dolomite is calcined and is then chlorinated in accordance with any of the known processes. This is customarily done by carefully hydrating the material, preparing a milk of lime of the desired specific gravity, and then chlorinating the milk of lime until substantially all of the calcium oxide has been chlorinated to produce $Ca(OCl)_2$, sufficient alkalinity being maintained to prevent the formation of chlorates or chlorides. For some reason not clearly understood the magnesia produced by calcining high magnesian rocks does not hydrate appreciably upon the addition of water, but remains as oxide. However, during the chlorination operation hydration may occur. At the end of this procedure the calcium hypochlorite will all be in solution and the residuum, consisting of a magnesium hydrate sludge, is allowed to settle and the liquid is then decanted or removed by any known method, or it may be filtered or filter-pressed to separate the materials. The resulting magnesium hydrate sludge may then be washed with water and settled or filtered as required. If chlorination is carried out by one of the substantially dry methods, the chlorinated lime is at first dissolved in water and then separated.

The drawing illustrates the process in flow-sheet form.

As an example of the invention, calcine dolomite, or impure magnesia, containing 38.60% magnesium oxide, 59% calcium oxide, 1.35% oxides of iron and aluminum, and 0.7% silica, was hydrated and chlorinated. The resulting magnesian sludge, on a dehydrated basis, showed 91.74% magnesium oxide, 4.05% calcium oxide, 2.46% oxides of iron and aluminum, and 1.30% silica. The chlorinated lime produced had substantially no magnesia content which could be detected upon analysis.

The lime content may be lowered below 4%, but as the lime is removed, the decrease in alkalinity promotes the formation of chlorates. In the normal production of calcium hypochlorite this is a disadvantage, but if it is desired to produce a purer magnesia the calcium hypochlorite solution may be decanted toward the end of the operation, and the chlorination continued regardless of the formation of chlorates.

The magnesia thus produced has particular value for the production of bisulfite liquor, although the hydrate may be used for any commercial purposes. In preparing bisulfite solution, the magnesian sludge is diluted with water to produce a milk of magnesia of the desired specific gravity. This is then sulfuretted in the desired manner, generally by scrubbing the milk of magnesia in towers with sulfur dioxide ($SO_2$). The solution, the base of which is almost entirely magnesia as $Mg(HSO_3)_2$, is more desirable than the bisulfite solution now in use in the sulfite pulp and paper industries.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. The method of utilizing magnesian rocks high in magnesia content, which comprises calcining the rock to produce a mixture of calcium and magnesium oxides, adding water thereto to hydrate the calcium oxide, chlorinating the resulting calcium hydroxide in the presence of water to produce a solution of calcium hypochlorite, the chlorination being stopped when substantially all the calcium and substantially none of the magnesium has been chlorinated, and separating the unchlorinated magnesia from the solution.

2. The method as set forth in claim 1, in which the calcined rock contains at least 22% MgO.

3. The method as set forth in claim 1, in which the calcined rock contains of the order of 22-44% MgO.

4. The method as set forth in claim 1 in which the calcined rock contains at least 22% MgO and the insoluble impurities are not greater than 10% of the amount of the magnesia.

5. In the method of preparing magnesium bisulphite from a high magnesian rock containing calcium, the steps of calcining the rock to produce a mixture of calcium and magnesium oxides, adding water to the oxides and chlorinating the resulting mixture to chlorinate substantially all of the calcium without chlorinating substantial amounts of the magnesia, separating the residual magnesia, and treating it with sulphur dioxide to produce magnesium bisulphite.

6. The method as set forth in claim 5, in which the calcined rock contains of the order of 22-44% magnesium oxide.

7. The method as set forth in claim 5, in which the calcined rock contains of the order of 22-44% magnesium oxide, and the insoluble impurities do not exceed 10% of the amount of the magnesia.

CLYDE DOUGLAS WYGAL.